United States Patent [19]

Mehta et al.

[11]  4,425,160
[45]  Jan. 10, 1984

[54] REFINING PROCESS FOR REMOVING ANTIMONY FROM LEAD BULLION

[75] Inventors: Jitesh R. Mehta; Andrew H. Larson, both of Eagan, Minn.

[73] Assignee: GNB Batteries Inc., Mendota Heights, Minn.

[21] Appl. No.: 444,258

[22] Filed: Nov. 23, 1982

[51] Int. Cl.$^3$ .............................................. C22B 13/06
[52] U.S. Cl. ........................................... 75/63; 75/78
[58] Field of Search ....................................... 75/63, 78

[56] References Cited

U.S. PATENT DOCUMENTS

| | | | |
|---|---|---|---|
| 1,786,908 | 12/1930 | Hanak | 75/63 |
| 2,365,117 | 12/1944 | Dittmer | 75/78 |
| 3,607,232 | 9/1971 | Lebedeff | 75/63 |

*Primary Examiner*—M. J. Andrews
*Attorney, Agent, or Firm*—Augustus J. Hipp

[57] ABSTRACT

An improved process for refining lead bullion containing antimony, in which the bullion is initially heated in a refining vessel to about 25° F. (14° C.) above the bullion melting point, and is thereafter kept molten primarily by exothermic process reactions. The process includes the steps of melting the lead-antimony bullion, agitating the bullion, adding caustic soda and metallic sodium to form an antimony-rich skimmable refining dross comprising a sodium-antimony intermetallic and separating the dross from the refined bullion. Along with antimony, other elements, such as arsenic, cadmium, copper, nickel, silver, sulfur, selenium, tellurium and zinc, if present in the bullion, are also removed in the dross by the sodium. The antimony-rich dross is accumulated for subsequent use. The process further comprises a cleansing operation wherein sodium present in solution in the refined bullion is removed using cleansing agents. This refining process is performed at a temperature between 600° F. (316° C.) and 800° F. (427° C.). Through the control of temperature, reagent addition and agitation, the process provides an environmentally nonpolluting and controlled process in which economies of materials, energy, time and labor are realized over conventional refining processes.

23 Claims, No Drawings

REFINING PROCESS FOR REMOVING ANTIMONY FROM LEAD BULLION

TECHNICAL FIELD

This invention relates to the refining of antimony bearing lead alloys to remove the antimony from the lead bullion.

BACKGROUND ART

Conventional methods of refining lead bullion containing antimony have included the use of refining reagents such as air, oxygen-enriched air, lead oxides, nitre and caustic, and aluminum, at high temperatures in excess of 1100° F. (600° C.). In such methods, gaseous oxidizing reagents such as air and oxygen-enriched air are pumped into the agitated bullion where the oxygen present in these gaseous reagents reacts with the antimony to form antimony oxides. When using solid oxidizing reagents, such as lead oxides or nitre and caustic, the reagents are added while the bullion is vigorously stirred. At the high operating temperatures involved, the antimony is oxidized and forms a dross which rises to the surface. In such processes, a large amount of lead is also either oxidized along with the antimony to form a lead oxide dross or is physically entrapped in the dross which rises to the surface as a high lead-content dross.

In using aluminum for antimony removal, the refining process is carried out at a temperature of 1300° F. The aluminum, upon addition, melts and is mixed into the bullion to react with the antimony to form an aluminum-antimony intermetallic which rises and is separated from the bullion as a dross. In this process, a considerable amount of lead is also physically entrapped in the dross.

In U.S. Pat. No. 1,786,908 to Hanak, alkali metals and caustic alkalies are used to separate antimony from lead and/or tin. He teaches that sodium will combine with antimony to remove any part of the antimony, by adding only that portion of sodium corresponding to the quantity of antimony to be removed. Hanak heats the metal or alloy to approximately 200° C. (approximately 360° F.) or more above its melting point and stirs a predetermined quantity of sodium into the metal. After mixing well, the temperature of the bath is somewhat lowered and sufficient caustic alkali is stirred in to dissolve the antimony-sodium alloy. The amount of caustic soda used is approximately four times the weight of the antimony extracted. The caustic sodium antimony alloy melt is run off, allowed to cool, and then treated by a water wash to dissolve the caustic soda and to react with sodium in the sodium-antimony compound to form the hydroxide with antimony being liberated in the metallic state.

Thus, in the Hanak process, the caustic soda added is four times the weight of the antimony extracted or about eight to ten times the weight of alkali metal added, and produces a molten caustic soda-sodium antimony slag which is difficult to handle with conventional batch refining equipment in a smelter and, in addition, the operating temperature of the process is 200° C. or more above the melting point of the lead-antimony bullion, thereby increasing the required fuel cost and significantly decreasing the overall efficiency of his process.

U.S. Pat. No. 3,607,232 to Lebedeff teaches a process for refining lead, particularly lead requiring softening and desilverizing, which comprises adding an alkali metal from the group consisting of sodium and potassium and mixtures thereof to a pool of the molten lead, agitating the molten pool to remove tellurium in the slag. The tellurium is removed from the molten lead at an extremely rapid rate at a temperature between the melting point of the lead and the temperature of the lead from the conventional pyrometallurgical lead softening process, i.e. at temperatures which ordinarily are below 1200° F. (649° C.) and which, depending on the softening process employed, may be as low as 850° F. (454° C.). The preferred operating temperature for carrying out the refining process is below 1200° F. and above the melting point of the lead to be detellurized, preferably at a temperature above 650° F. (343° C.). The amount of sodium or potassium or mixtures thereof employed is equivalent to 0.3 to 0.8 pounds of sodium per pound of tellurium to be removed from the lead, with 1 pound of sodium being equivalent to 1.7 pounds of potassium. He also contemplates antimony removal during the refining process to remove most of the antimony due to the fact that where arsenic and antimony content of the lead is above about 0.02% by weight, relatively large quantities of antimony as well as arsenic are incorporated into the tellurium during the detellurizing procedure. The sodium or potassium or mixtures thereof are incorporated in the lead by adding them as a master alloy of lead which may be added in a liquid or solid form during agitation of the melt. The agitation required to reduce the tellurium in the lead to a given amount will vary inversely with the vigor of the agitation, i.e. with more vigorous agitation a short agitation period can be used and vice versa. The Lebedeff process is practiced at a temperature above 650° F. and below 1200° F. and most preferably in the range 800° to 850° F. for the removal of tellurium. Lebedeff also utilizes his process to soften bullion containing copper, bismuth, antimony, arsenic, selenium, silver and gold; however, the addition of sodium hydroxide and metallic sodium for the removal of tellurium from the bullion results in a bullion which retains the original percentage of copper, bismuth, arsenic, silver and gold although significant reductions are realized in the content of antimony and selenium retained in the bullion.

Thus, the Lebedeff process must be carefully controlled in order to remove the desired quantity of tellurium from the bullion and will also remove certain amounts of antimony and selenium, along with the tellurium; however, subsequent processing is required in order to further refine the bullion to remove copper, bismuth and other metal values.

All of the above prior art processes have shortcomings in that they are inefficient either in materials utilization, length of time to process the bullion, and/or energy consumption and fail to adequately remove other metal values in the initial processing, thereby necessitating extensive further softening procedures. In contrast, the process of the present invention refines the bullion within a controlled temperature range by the addition of sodium to remove antimony and substantial amounts of other common alloying metals and elements, such as arsenic, cadmium, copper, nickel, silver, sulfur, selenium, tellurium and zinc present in the lead bullion, which react with the sodium to form intermetallics and compounds which are recovered in the dross.

DISCLOSURE OF THE INVENTION

While the present invention is susceptible of various modifications and alternative forms, specific embodiments thereof are described in detail herein. It should be understood, however, that it is not intended to limit the invention to the particular embodiments or forms disclosed, but, on the contrary, the invention is to cover all modifications, equivalents, and alternatives falling within the spirit and scope of the invention as expressed in the appended claims. Thus, for example, while the present invention will be principally described in connection with the use of only one alkali metal, i.e. sodium, as the refining reagent, it should be appreciated that the present process may likewise employ any of the other alkali metals as the refining reagent without significantly adversely affecting the refining process.

The present invention provides an energy, time and material efficient refining process for the removal of antimony and other elements from lead bullion by the addition of metallic sodium as refining reagent to the molten bullion.

The process is intended for use either as a batch or continuous process in removing substantially all or a controlled amount of antimony from the lead bullion. However, the process efficiency decreases substantially when the antimony concentration is reduced below approximately 0.5% to 1% by weight. As used herein, all percentages shown or discussed are percent by weight and should be so understood.

The process of the invention comprises initially heating, by conventional heating means, the antimony-containing lead bullion in a refining vessel to a temperature of about 25° F. (14° C.) above the melting temperature of the bullion. The heating is then discontinued as all further heating of the bullion is accomplished by exothermic chemical reactions between metallic sodium and the antimony in the lead bullion and the heat of solution from sodium going into solution in the bullion. The molten lead bullion is agitated to develop a strong vortex. Caustic soda, also referred to herein as "caustic," is then added to the bullion where it melts and is mixed with the bullion. Metallic sodium as the refining reagent is then added directly to the vortex where it melts and is thoroughly mixed into the bullion. After mixing has been accomplished, the agitation is stopped and an antimony-rich refining dross in the form of a black, soft, sticky and chunky skimmable dross forms and rises to the surface of the molten bullion. The term "skimmable" as used herein refers to a dross which, because of its consistency and high viscosity, is easily removed from the molten bullion surface using conventional skimming equipment.

Drosses resulting from conventional refining processes inherently contribute to environmental pollution due to the physical characteristics of the drosses, i.e. usually in the form of fine particles which easily become airborne. Under the process of the present invention, the dross, as above described, is substantially nonpolluting.

As observed from the examples hereinafter discussed, the ratio of caustic to sodium added should generally be within the range of 1:15 to 1:4, or stated in terms of caustic added to antimony removed the ratio should be between 1:75 to 1:2. This contrasts with the prior art alkali metal process wherein the ratio of caustic soda added to antimony extracted is 4:1. Further, in the present invention, the ratio of antimony removed to sodium added should generally be within the range of 5:1 to 0.5:1, with operational ranges for these ratios as hereinafter discussed.

Upon addition of sodium, along with the antimony removed from the bullion, other common elements such as arsenic, cadmium, copper, nickel, silver, sulfur, selenium, tellurium and zinc commonly present in secondary lead bullion are also removed. These elements react with the sodium to form intermetallics or compounds which separate and are recovered in the refining dross.

A limited amount of tin is also removed with the antimony when the process is practiced as hereinafter described; however, the amount of tin removed can be controlled by the extent of agitation and the amount of caustic soda added. If, for product reasons, most of the tin is to be retained, then the bullion agitation should be limited and the amount of caustic soda added should be ample, but in an amount sufficient to create the desired black, soft, sticky and chunky dross. This refining dross is removed and stored separately for further treatment. The partially refined molten bullion is then ready for further sodium refining treatment, or, if the antimony content has been reduced to the desired level, then the bullion is ready for cleansing of residual sodium remaining in solution.

Upon each addition of metallic sodium, the temperature of the bullion increases by an amount which is dependent upon the extent of sodium burning, the sodium-antimony reaction and the sodium going into solution in the lead and it may be necessary to cool the bullion from time to time in order to maintain the operating temperature below 800° F. (427° C.) Subsequently, after the refining operation is completed, the bullion is cleansed of remaining sodium, as hereinafter described.

The bullion cleansing step or operation is performed as close as possible to the bullion melting temperature, using cleansing reagents such as water, oxygen-enriched air, nitre, sulfur, selenium, tellurium, phosphorus, chlorine or mixtures thereof. By the use of oxidizing cleansing reagents, the oxygen present in such reagents reacts with the sodium present in the bullion to form sodium oxides and hydroxides which form a skimmable cleansing dross which can be easily skimmed from the bullion. The cleansing elements, such as sulfur, selenium, tellurium, phosphorus and chlorine react with the sodium to form compounds which separate, rise to the surface of the bullion and can easily be skimmed.

By using the present invention, antimony may be removed from lead bullion to a predetermined level in a less polluting, cost-effective and controlled manner as compared to conventional refining processes. The process produces a refined metal which is substantially free of impurities resulting from reagents used in the process, namely, sodium. Simultaneous with the antimony removal, the process also substantially removes other elements such as arsenic, copper, cadmium, nickel, silver, sulfur, selenium, tellurium and zinc.

In general, improvements are made by the present process over the known alkali metal process by removing antimony from lead or lead alloys in which sodium is added, as the refining reagent, to the molten antimony-containing lead bullion at a much lower temperature to form a sodium-antimony intermetallic. Indeed, the present process provides an unexpected and surprisingly efficient process by operating at the defined low temperatures as set forth, thus resulting in unexpected, but significant materials and energy savings. The present process also incorporates the addition of caustic soda in considerably smaller amounts, as compared to the alkali metal process, to assist in the separation of the sodium-antimony intermetallic from the refined lead bullion and thereby result in the formation of a caustic soda-sodium antimony dross which, because of its consistency and high viscosity, can be easily skimmed from the bullion using conventional skimmers, as contrasted with the very liquid (low viscosity) caustic soda-sodium antimony alloy which is "run off" in the alkali metal process.

The metallic sodium can be added in the form of solid bricks or liquid. If added as bricks, the sodium should be added, one brick after another, to the vortex of the agitated bullion, as contrasted to addition of large quantities which results in loss of sodium due to burning. The presence of a strong vortex is essential for rapid mixing of the sodium into the bullion. Thus, the sodium bricks are added one after another as soon as the fire from the previous brick has subsided. If the sodium is to be added in liquid form, the molten sodium is pumped directly under the surface of the bullion during agitation.

Broadly speaking, the process of the present invention is very flexible and the quantity and sequence of caustic and sodium additions may be varied within broad limits and yet achieve substantially the same advantages as are obtained in adhering to the quantities and sequences desired in the preferred embodiment. For example, all of the caustic may be added in one step prior to sodium addition which may be added in increments to control the attendant temperature increases until the final bullion composition is achieved, followed by the required cleansing step.

In conventional refining pressure, almost no tin present in the battery scrap feed for secondary lead smelting is directly utilized in the final product because the tin is always removed and accumulated in the system, either in the refining drosses, reverberatory drosses, or the blast bullion. The reason for this is that any time the antimony is removed in a refining process, the tin is removed first due to its high susceptibility to oxidation. This situation may require the purchase and addition of primary tin to meet the tin requirements for the finished alloy product. These tin purchases can be reduced significantly by using the sodium refining process of the present invention as described. Conventional refining is carried out at high temperatures, i.e. above about 1150° F. These high temperatures increase the fuel costs and reduce kettle life due to kettle stretching (actual physical deformation due to high operating temperature and high load factors). In lead refining, using the present invention, the starting temperature is approximately 600° F. after which the temperature of the process is self-sustaining as the result of the exothermic reactions, thereby maintaining the bullion molten throughout the process. The highest temperatures incurred during the process of the present invention are in the range of 800° to 850° F., where no significant kettle stretching problems are encountered.

From the description and examples of the present invention hereinafter described, it may be seen that initially, any antimonial bullion which is to be refined using metallic sodium, will consume a certain amount of sodium to saturate the bullion before any refining action can be realized. This sodium, as such, is not available to the sodium-antimony reaction, and although it is required to initiate the refining process, it does not contribute directly to the refining reactions.

It should be emphasized that while using the sodium refining process of the present invention, close watch must be maintained on the bullion temperature as each sodium addition to the bullion causes the temperature of the bullion to increase due to the exothermic nature of the chemical reactions involved. When the bullion temperature increases in excess of 750° F., the sticky and chunky antimony-rich dross becomes very liquid, i.e. having a low viscosity, and is very difficult to skim. Care should be exercised during the process to permit the bullion to cool if necessary. Also, caution should be exercised as no water should be used to induce such cooling, because the water will react with the sodium in the sodium-antimony intermetallic to strip the antimony already collected in the dross and return it to the bullion. In order to avoid excessive heating of the bullion, i.e. over 750° F., during the process, the starting bullion temperature should be limited to a maximum of 600° F. to 650° F.

While using this sodium refining process, the antimony-rich dross should be skimmed after every 600 pounds (or as deemed by observation of the operator to be appropriate) of sodium addition in order to avoid excessive accumulation of dross which will inhibit the mixing operation. Significant dross accumulation (i.e. a dross thickness in excess of about 4 in. thick over the entire bullion surface) may freeze into a hard crust when allowed to settle, and become difficult to efficiently skim. In Experiment VI, it is shown that upon allowing the dross to accumulate until 1200 pounds of sodium had been added and the dross allowed to cool, the dross solidified into a hard crust in excess of 6 in. thick, was very difficult to remove and required approximately $2\frac{1}{2}$ hours to break and skim.

In those situations when the bullion is to be refined to make soft lead, the sodium process should be used until approximately 0.5% antimony remains. The antimony removal efficiency of sodium drops significantly at lower antimony concentrations. At this low level of antimony concentration, it is recommended to use nitre as the refining reagent instead of sodium to continue the refining. In such situations, the bullion should be heated to above 900° F. and nitre added to the bullion in order to complete the refining process. In such situations, the nitre added will serve a three-fold purpose. First, the nitre will remove the tin which has not been removed by the sodium process. Secondly, the nitre will remove the sodium present in solution in the bullion and since the bullion must be cleansed of this sodium in any event, the use of the nitre will accomplish this cleansing action instead of using the preferred sulfur treatment as hereinafter described. Thirdly, the nitre will remove the remaining antimony from the bullion.

Best Mode for Carrying Out the Invention

In preparation for carrying out the process, the bullion is analyzed to determine its antimony content and, therefrom, a determination is made of the quantity of antimony to be removed to obtain the desired end product. From this information, the amount of sodium to be added is calculated, using a ratio of between 2.5 units and 1.5 units of antimony to be removed to 1 unit of sodium to be added. The amount of caustic required is as previously described, i.e. between 1/15th (best) to ¼th (least desirable) of the total amount of sodium to be added and more preferably between 1/10th and 1/6th of the total amount of sodium to be added. These additives are made readily available for use in the process.

The preferred method of practicing the process of the present invention includes the step of heating the antimony-containing lead bullion to a temperature just above the melting point of the bullion, preferably 25° F. (14° C.) above its melting point and then removing the heat source. The purpose in starting the process at a temperature just above the melting point of the bullion being treated is to minimize the amount of metallic sodium which goes into solution in the bullion and is lost to the sodium-antimony reaction as it does not react with the antimony of the bullion to form the sodium-antimony intermetallic to extract the antimony. The use of the low starting temperature also provides a wider temperature range over which the sodium can be added, with the attendant temperature increases remaining within the desired range. Once the process is started, the heat source is removed as the process requires no further heat additions due to the highly exothermic reactions of sodium going into solution in the bullion and of sodium reacting with antimony, whereby sufficient heat is liberated to keep the bullion molten; indeed, sufficient heat is liberated to increase the temperature of the bullion at a rate of approximately 30° to 40° F. for each 300 pounds of metallic sodium added in refining a typical 75 ton lead bullion melt. This heat liberation is sufficient with each sodium addition, to further increase the overall economy of the process by realizing significant fuel savings.

The next step is to start agitating the bullion to develop a strong vortex for subsequent addition and thorough mixing of caustic soda and metallic sodium into the bullion. It is essential that the agitation be sufficiently strong to maintain a vigorous vortex throughout the steps of adding the caustic soda and the metallic sodium.

In the instant process, to prevent unnecessary sodium loss due to burning, it is desirable to add the caustic soda to the bullion prior to the metallic sodium addition. This is done in order to cover and thereby protect the sodium. This caustic is also available to the sodium-antimony intermetallic as soon as it is formed, and also protects any tin present in the bullion from excessive loss. The caustic required for the process preferably is not added all at one time, but on the contrary, is added in small increments as needed, alternately with small amounts of metallic sodium.

The amount of metallic sodium to be added to the bullion is precalculated, knowing the amount of bullion to be treated and the amount of antimony to be removed. The most practicable ratio of antimony removal to sodium addition is approximately 1.5 pounds (units) of antimony to 1 pound (units) of sodium. From experimental results, it has been empirically determined that this ratio appears to be the most practicable for use in commercial operations, although substantially higher (i.e. higher antimony removal) ratios have been realized experimentally. Not all of the required sodium is added at one time as the sodium is also added in small increments, as is done with the caustic, in order to avoid excessive sodium loss, due to burning. The sodium is added to the agitated bullion vortex and, after the sodium has been thoroughly mixed into the bullion, agitation is stopped. A sodium-antimony intermetallic forms and, in the presence of the caustic soda, separates from the bullion as a black, soft, sticky and chunky refining dross. For maximum efficiency in sodium utilization, this process requires vigorous stirring, sufficient to create a strong vortex, to ensure the thorough mixing of the metallic sodium upon its addition to the bullion. The temperature of the bullion is preferably maintained between the melting point of the respective lead alloy, approximately 600° F. and 800° F. (316° C. and 427° C.) and more preferably below 700° F. (371° C.) in order to realize maximum efficiency from the process. At higher temperatures, i.e. above about 800° F., the metallic sodium, upon addition, either goes into solution or burns on the surface of the bullion and is thereby wasted and lost to the sodium-antimony reaction, thus significantly reducing the efficiency of the process.

The caustic/sodium schedule for adding to the bullion is followed until either all of the required amount of sodium is added or the temperature of the bullion reaches 750° F. Upon reaching the temperature of 750° F., if more sodium is to be added, the bullion is cooled to about 600° F. prior to the addition of more caustic and sodium in order to avoid excessive amounts of metallic sodium going into solution in the bullion and thus being made unavailable to the desired reaction. Further, this cooling provides an added advantage of decreasing the solubility of the sodium in the lead bullion. Upon cooling, metallic sodium in solution precipitates and reacts with the antimony in the bullion to form the sodium-antimony intermetallic which, in the presence of caustic soda, separates from the bullion as a refining dross. Thus, the cooling of the bullion forces the sodium in solution to precipitate and react with the antimony and is a significant step in keeping the sodium content of the bullion to a minimum, thereby offering additional advantages in time and materials required in the final stages of cleansing of the bullion to remove the remaining sodium therefrom. Upon the completion of the addition of all the required sodium, the agitation should be stopped as additional agitation leads to excessive loss of tin and reversion of the antimony in the refining dross back into the bullion. Thus, unnecessary agitation should be avoided upon completion of the addition and mixing into the bullion of all of the sodium required.

The physical characteristics of the antimony-rich refining dross depend upon the amount of caustic soda added as well as the temperature of the bullion. If the amount of caustic soda added is excessive, as determined by observation, the dross will be black, but very liquid and very difficult to skim using conventional skimmers. If excessive caustic soda has been added, quicklime or lime is added to the dross to make the dross sticky and chunky and skimmable. If the dross is grayish in color, and very heavy due to a large amount of lead entrapped with the sodium-antimony intermetallic, more caustic is added during agitation in order to combine with the sodium-antimony intermetallic and separate the intermetallic from the entrapped lead. In order to effect such separation, sufficient caustic soda is added to transform the dross from a grayish color to a black color and form a dross which is soft, sticky, chunky and free of entrapped lead, and which is easily skimmed using conventional skimmers.

The refining dross is skimmed into containers where it may be allowed to cool for later use, or the dross may be used immediately as an antimony concentrate. Upon cooling, the dross becomes very hard and brittle and can be easily broken into smaller chunks and stored for future use.

After removal of the required amount of antimony from the bullion, the refined bullion is cleansed of sodium in excess of 0.002% by weight. This bullion cleansing step or operation is performed preferably as close as possible to the bullion melting temperature and preferably using sulfur and water as cleansing reagents simultaneously. The sulfur reacts with the sodium to form sodium-sulfur compounds. The water reacts with the sodium to form sodium hydroxide. The aforementioned compounds, formed in the cleansing step, form a skimmable cleansing dross. Both of these reactions are exothermic and liberate sufficient heat to keep the bullion molten; indeed, sufficient heat is liberated to increase the bullion temperature at a rate of approximately 25° F. for each 50 pounds of sulfur added to a typical 75 ton lead bullion melt. In addition to reacting with the sodium, water also assists in keeping this temperature increase under control by consuming heat in the formation of steam.

The use of low temperature in the cleansing operation is for the purposes of limiting loss of the cleansing reagents through evaporation or burning and reducing the solubility of sodium in the bullion thereby making the sodium easier to remove.

The preferred embodiment is best exemplified in Example I as described below.

EXAMPLE I

Seventy-five tons of lead bullion to be processed was analyzed to contain 3.5% antimony—0.64% tin—0% sodium. The final bullion was to contain about 1.5% antimony. Thus, in refining approximately 75 tons of lead bullion, 3000 pounds of antimony were to be removed and required 2000 pounds of sodium for such removal, based upon calculations using the aforementioned most practicable ratio of 1.5:1. Also, based upon the ratio of 1:10 of caustic added to sodium added, 200 pounds of caustic were required. In describing the following process, caustic soda is added be shovelfuls and typically averages approximately 4.65 pounds per shovelful. Likewise, the metallic sodium is in the form of bricks and the sodium is added one brick at a time until the required amount of sodium addition is completed for the particular step involved.

With the molten bullion at 600° F. (316° C.) and ready for processing, the heat source was shut off for the remainder of the process, the bullion was agitated to establish a strong vortex and 8 shovelfuls of caustic soda (approximately 37.2 pounds) were added. Following the caustic soda addition, 225 pounds of metallic sodium were added. The temperature of the bullion increased to 635° F. (335° C.) as the result of the exothermic reaction between the sodium and the antimony in the bullion and the sodium going into solution in the bullion. Six more shovelfuls of caustic (approximately 27.9 pounds) were added to the vortex and an additional 300 pounds of metallic sodium were added. The temperature of the molten bullion increased to 660° F. (349° C.) due to the metallic sodium addition. The bullion was again analyzed and found to contain—3.3% antimony—0.57% tin—0.162% sodium. While maintaining a strong vortex, 6 additional shovelfuls of caustic soda (approximately 27.9 pounds) were added and 300 additional pounds of metallic sodium were added. The temperature of the molten bullion had then reached 700° F. (371° C.). The agitation was stopped and the molten bullion allowed to stand for 5 minutes after which the refining dross was skimmed over a period of approximately 10 minutes. The molten lead bullion was again analyzed and found to be 3.2% antimony—0.57% tin—0.2934% sodium. Agitation was again commenced to develop a strong vortex and 5 shovelfuls of caustic soda (approximately 23.25 pounds) were added to the vortex, followed by the addition of 300 pounds of metallic sodium. As the result of the sodium addition, the bullion temperature increased to 725° F. (385° C.). The molten lead bullion was analyzed and found to contain 3.0% antimony—0.57% tin—0.3413% sodium, approximately 12 minutes after the completion of a second refining dross skimming step. Two shovelfuls of caustic soda (approximately 9.3 pounds) were then added to the vortex, followed by 150 pounds of metallic sodium. Ten minutes later the temperature of the molten bullion was measured and found to be 750° F. (399° C.). At this point, the agitation was stopped and the bullion allowed to settle for a period of 10 minutes after which the refining dross was skimmed over a period of 6 minutes and the bullion analyzed again. The analysis was 2.6% antimony—0.52% tin—0.2563% sodium. At this point, due to the temperature of 750° F., the molten bullion was permitted to settle and cool for a period of approximately 4 hours. Any dross formed during this cooling period was skimmed from the bullion. At the end of the cooling period, another analysis was made of the bullion and it was found to contain 2.4% antimony—0.49% tin—0.1879% sodium. It should be noted that, prior to cooling, the antimony and sodium in the bullion were analyzed to be 2.6% and 0.2563% respectively and after cooling were analyzed to be 2.4% and 0.1879% respectively, thus showing that upon cooling the sodium solubility in lead decreases and it precipitates to react with the antimony to form the sodium-antimony intermetallic. With the agitation resumed, one shovelful of caustic soda (approximately 4.65 pounds) was added to the vortex and the refining dross was skimmed from the bullion. Another analyis was made of the lead bullion and it was found to be 2.5% antimony—0.49% tin—0.2080% sodium. After permitting the bullion to cool approximately 4 hours and 20 minutes, the temperature had reached 600° F., at which time agitation was resumed and 2 shovelfuls of caustic soda (approximately 9.3 pounds) were added to the vortex, followed by the addition of 150 pounds of metallic sodium. The temperature of the bullion then increased to 670° F. (354° C.) upon measurement approximately 7 minutes after the sodium addition. Four shovelfuls of caustic soda (approximately 18.6 pounds) were then added to the vortex, followed by the addition of 300 pounds of metallic sodium. After a period of approximately 18 minutes, the temperature of the bullion was measured and found to be 710° F. (377° C.), at which time another analysis was made of the bullion and found to be 2.1% antimony—0.45% tin—0.2913 sodium. A partial skimming of the refining dross was performed at this time, followed by the resumption of agitation and the addition of 6 shovelfuls of caustic soda (approximately 27.9 pounds), and an addition of 300 pounds of metallic sodium. After 55 minutes, the temperature of the bullion was found to be 750° F. and another sample was taken and the bullion was analyzed to be 1.8% antimony—0.40% tin—0.2500% sodium. The dross was skimmed from the bullion after the analysis was made, and the bullion was permitted to cool and settle over the next 6 hours and 45 minutes to a temperature of 600° F, and then was analyzed to be 1.5% antimony—0.35% tin—0.1253% sodium. At this time, agitation was again resumed and 3 shovelfuls of caustic (approximately 13.9 pounds) were added to the bullion, followed by 150 pounds of metallic sodium. The temperature increased to 625° F. (329° C.) and the bullion was again analyzed to be 1.3% antimony—0.31% tin—0.1361% sodium. No further additions were made to the melt for a period of 45 minutes at which time the refining dross was skimmed from the kettle over a period of 30 minutes. It should be noted that a total of 2175 pounds of metallic sodium were used in the refining process instead of the precalculated 2000 pounds since the starting bullion weight of 75 tons was an approximation and the ratio of antimony removed to the sodium added was probably less than 1.5:1. It should also be noted that the total of 200 pounds of caustic used in the process was 1/11th of the total amount of sodium added which is better than the preferred ratio range. The next step involved the cleansing step by the addition of sulfur as the cleansing reagent to the refined bullion; however, prior to commencing the cleansing step, the refining dross residue and the kettle walls was torched in order to melt the dross into the kettle. This process required approximately 30 minutes to complete. The bulk of the dross was then skimmed. An analysis was then made of the refined bullion which was found to be 1.3% antimony—0.30% tin—0.1340% sodium. The bullion was agitated in order to accumulate the remaining refining dross, which was skimmed. The bullion was analyzed to be 1.37% antimony—0.32% tin—0.1380% sodium. Approximately 30 minutes later, the temperature was again measured and found to be 600° F., at which time agitation was resumed and 100 pounds of sulfur were added to the bullion vortex. The sulfur reacts exothermically with the bullion and increased the temperature of 650° F. Another addition of 100 pounds of sulfur was made and the temperature increased to 700° F. and an analysis was made of the bullion and found to be 1.46% antimony—0.32% tin—0.0524% sodium. Another 100 pounds of sulfur were then added and the temperature of the bullion increased to 750° F. One hour later the bullion was analyzed to be 1.48% antimony—0.31% tin—0.0199% sodium. It should be noted that the antimony content of the bullion surprisingly increased during the cleansing step from 1.37% to 1.48% as the result of sulfur reacting with the sodium present in the small amount of sodium-antimony intermetallic which inherently remains suspended in the bullion after skimming, thus releasing the antimony and increasing its content in the bullion. The final step requiring approximately 30 minutes included the step of skimming the dry sulfur cleansing dross from the bullion and adding an additional 50 pounds of sulfur cleansing reagent to remove the remaining sodium. Thus, the total elapsed time from start-up (with molten bullion already at 600° F.) to the finishing cleansing step just described was a total of 18 hours and 15 minutes. Detailed analysis, including those of impurity elements, for the above described process is shown as Test B as set forth in Table 1 of Example VII below. The materials and time data of the above-described process are shown as Test B as set forth in Table 2 of Example VII below.

The following examples also show the advantages of utilizing the present invention for refining lead bullion and exemplify the wide range over which the preferred embodiment may be practiced.

EXAMPLE II

The following example shows the effect of adding sodium in refining a lead—2.70% by wt. antimony alloy.

Four hundred ten pounds of lead—2.70% by wt. antimony alloy were heated to 738° F. (392° C.) and agitated to develop a strong vortex. One pound of caustic soda, followed by 1 pound of sodium bricks were added to the bullion vortex and stirred vigorously for 2 minutes. Agitation was stopped and the bullion permitted to settle. Bullion sample No. 1 was taken and analyzed as shown in the Analysis Table below. Agitation was resumed and 1 pound of sodium was stirred vigorously for 2 minutes after which the stirring was stopped and the bullion permitted to settle. Bullion sample No. 2 was taken and analyzed as shown in the table. Agitation was again resumed and 1 pound of caustic soda was added, followed by the addition of 1 pound of sodium to the bullion vortex; the bullion was stirred vigorously for 2 minutes and again permitted to settle. Bullion sample No. 3 was taken and analyzed as shown in the table. Agitation was resumed and an additional 1 pound of sodium was added, followed by vigorous stirring and settling as before. Bullion sample No. 4 was taken and analyzed as shown in the table. The preceding step was repeated with the addition of 1 pound of sodium. The refining dross was skimmed. Agitation was resumed and an additional ½ pound of caustic soda was added to assist in separating the sodium-antimony intermetallic from the bullion. The dross was skimmed and bullion sample No. 5 was taken and analyzed as shown.

TABLE 1

| Sample | Analysis in % by Wt. | | |
|---|---|---|---|
| | Sb | Sn | As |
| Starting Bullion | 2.70 | 0.107 | 0.0122 |
| Sample No. 1 | 2.36 | 0.108* | 0.0017 |
| Sample No. 2 | 1.65 | 0.076 | 0.0002 |
| Sample No. 3 | 0.903 | 0.037 | 0.0013* |
| Sample No. 4 | 0.716 | 0.048 | 0.0003* |
| Sample No. 5 | 0.458 | 0.058* | 0.0001 |

*Higher readings are attributed to possible element segregation in samples and instrument drift and error.
Note:
Other elements at impurity levels have been omitted.

TABLE 2

Ratio of Sb Removal to Na Addition
All % in % by Wt.

| Starting Sb | | Final Sb | | Sb Removed | Na Added | % Sb Removed | | Ratio |
|---|---|---|---|---|---|---|---|---|
| % | lbs. | % | lbs. | lbs. | lbs. | Per Step | Total | Sb:Na |
| 2.705 | 11.07 | 2.356 | 9.66 | 1.41 | 1.00 | 12.70 | — | 1.41:1 |
| 2.356 | 9.66 | 1.646 | 6.75 | 2.91 | 1.00 | 30.14 | 39.02 | 2.91:1 |
| 1.646 | 6.75 | 0.903 | 3.70 | 3.05 | 1.00 | 45.16 | 66.58 | 3.05:1 |
| 0.903 | 3.70 | 0.716 | 2.94 | 0.76 | 1.00 | 20.54 | 73.44 | 0.76:1 |
| 0.716 | 2.94 | 0.458 | 1.88 | 1.06 | 1.00 | 36.07 | 83.01 | 1.06:1 |

Note:
Total caustic added was 2.5 lbs.
Total refining dross skimmed was 28.3 lbs.

From this example, the following observations were made:
 (a) As seen in Table 2, the first sodium addition results in a low ratio of antimony removal for a pound of sodium added since most of the sodium added in this step goes into solution in the bullion and thus is not available for the antimony removal reaction;
 (b) As seen in Table 2, the second and third sodium additions resulted in a high ratio of antimony removal for each pound of sodium added and established a surprisingly high ratio of approximately 3:1, (c) From Table 2, it is also apparent that, at antimony concentrations on the order of approximately 1% by wt. or less, the efficiency of sodium for antimony removal is significantly decreased as the ratio of antimony removed to sodium added drops drastically from about 3:1 to about 1:1, and (d) Substantially all of the arsenic was removed.

EXAMPLE III

A bullion refining experiment was performed using 427 pounds of lead containing 8.4% by wt. antimony. The bullion was refined to 2.3% by wt. antimony using metallic sodium.

The following table shows by stages the antimony percentage decrease, the temperature change at each stage, cooling, and the antimony removal to sodium addition ratio observed. In this example, a total of 3 pounds of caustic was added during the operation, along with a total of 8 pounds of sodium as described in the preferred embodiment, and a cleansing step was performed using sulfur which reduced the sodium content in the bullion to 0.0005% by wt.

TABLE

| Stage | Antimony % by Wt. | | Operating Temperature °F. | | Ratio Sb Removed: Na Added |
|---|---|---|---|---|---|
| | Start | End | Start | End | |
| 1 | 8.4 | 7.3 | 610 | 665 | 2.70:1 |
| 2 | 7.3 | 5.3 | 610 | 670 | 4.84:1 |
| 3 | 5.3 | 3.4 | 645 | 710 | 4.08:1 |
| 4 | 3.4 | 2.3 | 655 | 730 | 2.14:1 |

From this example, the following observation is made: When starting with a bullion having a high antimony content, i.e. about 6% or higher, the ratio of antimony removed to sodium added is significantly increased over the practicable ratio of 1.5:1 described in the preferred embodiment.

EXAMPLE IV

Approximately 75 tons of 2.6% by wt. antimony-lead bullion was heated to 655° F. (346° C.) for sodium refining. Four drums (1200 lbs.) of metallic sodium, along with 125 lbs. of caustic soda, were added, as described in the preferred embodiment, to the bullion to refine the bullion to 1.5% by wt. antimony. At this point, it should be noted that the ratio of caustic-to-sodium added is 1:12.8 which is at the lower extremity of the aforementioned range. The bullion temperature increased, as the result of the sodium additions, to 790° F. (421° C.). Since the temperature was so high late in the work day, the operation was stopped for the day, but to be continued the next day. The bullion was skimmed clean of all refining dross and the bullion analyzed 1.5% by wt. antimony. Overall antimony removal ratio observed for the first day was 1.4:1 (1.4 pounds of antimony removed to 1 pound of sodium added).

The next morning (after an elapsed time of approximately 15 hours), prior to continuing the refining operation, the bullion was again analyzed and found to contain 1.9% by wt. antimony. In addition to antimony, the bullion had unexpectedly acquired copper, nickel and tin, and there also was an unexpectedly large accumulation of metallic dross in excess of 4 in. thick. This was very surprising since the bullion had been skimmed clean the previous evening (no work was done on it overnight) and the bullion had analyzed 1.5% by wt. antimony. Upon adding one more drum (300 pounds) of metallic sodium, the percentage of antimony remained the same, but the copper percentage unexpectedly increased. The bullion analysis, along with the amount of metallic sodium added, and time reference is given in the following table.

TABLE

| Day/Time | | Total Na Added in Metallic Form | Bullion Composition in % by wt. | | | | | |
|---|---|---|---|---|---|---|---|---|
| | | | As | Cu | Ni | Sb | Sn | Te |
| 1 | 13:18 | — | .0268 | .0638 | .0006 | 2.62 | .3000 | .0013 |
| 1 | 16:24 | 1200 lbs. | .0051 | .0172 | .0001 | 1.50 | .1589 | 0 |
| 2 | 07:46 | 1200 lbs. | .0052 | .0385 | .0003 | 1.90 | .2039 | 0 |
| 2 | 09:35 | 1500 lbs. | .0052 | .0416 | .0004 | 1.88 | .1892 | 0 |

Commensurate with the increase in concentrations of copper, nickel and tin in the bullion, an unusually large amount of metallic dross was formed. Such dross formation was unexpected as it is not typical of the sodium refining process. In view of these unexpected results, the operation was stopped, the dross was removed and the bullion was pumped into button molds. The empty kettle revealed the cause of the unexpected results. The kettle walls were absolutely clean with no slag or dross residue. This lack of slag residue was surprising since the kettle walls had an excessive slag build-up (from previous conventional refining operations) when the kettle was filled with the 2.6% by wt. antimony-lead bullion prior to the sodium refining experiment. Thus, due to the vigorous sodium refining reaction, the slag build-up on the kettle walls was dislodged and mixed with the bullion, resulting in the alloying elements contained in the slag going into solution in the lead bullion and decreasing the observed efficiency of the sodium refining process. This dislodging and mixing into the bullion of the slag residue explains the unexpected overnight increase in percentage of copper, nickel, antimony and tin and the excessive amount of dross discovered the next morning.

The overall antimony removal ratio was observed to be about 0.74:1 of antimony removed to sodium added. This ratio was lower than anticipated and was attributed to the following causes:

(a) The dislodging and absorption into the molten bullion of the previous slag or dross residue adhering to the kettle walls; and (b) Non-uniform and/or weak agitation. The agitator on the kettle, due to worn out blades, was not strong enough to maintain the desired strong vortex to facilitate the desired sodium mixing. The sodium floated on the bullion surface and burned instead of being pulled into the vortex and dissolving in the lead bullion to react with the antimony.

From this example, the following observations are made:

(a) The kettle walls should be free of dross or slag from previous refining operations prior to commencing the sodium refining process;

(b) The process can be used advantageously for cleaning the kettle walls of previous adherent dross or slag residue; and (c) Strong agitation is essential for establishing a strong vortex for mixing purposes.

EXAMPLE V

Approximately 75 tons of 3.1% by wt. antimony-lead bullion was treated with metallic sodium to refine it to 1.5% by wt. antimony. The experiment was started at 13:30 with the bullion temperature at 705° F. (374° C.). The first 900 pounds (3 drums) of metallic sodium added to the bullion refined the bullion to 2.5% by wt. antimony at an overall antimony removal to sodium addition ratio of 1.1 with an accompanying temperature increase to 800° F. In the eagerness to finish refining the bullion to the required antimony content by evening, the bullion was not allowed to cool to the efficient operating temperature of below 750° F. An addition of 900 pounds (3 drums) more of metallic sodium did not remove any more antimony. The temperature, however, increased to 900° F. (482° C.) as the result of the evolution of heat from the sodium going into solution in the bullion and sodium burning. Most of the sodium added went into solution in the lead instead of reacting with and removing the antimony.

The partially refined bullion was then cleansed of substantially all sodium in solution using sulfur and water. The cleansed, partially refined bullion was allowed to cool and settle overnight (approximately 8 hours) and the next morning with the bullion temperature at 640° F. (338° C.) the refining process was resumed. A total of 900 pounds (3 drums) of metallic sodium was added, along with 60 pounds of caustic. The sodium addition was made slowly, with intermediate settling of the antimony-rich refining dross for 20 to 30 minute periods. This allowed the bullion to settle and cool to the desired temperature of <750° F. prior to further sodium addition.

The bullion was refined to 1.55% by wt. antimony from 2.5% by wt. antimony, resulting in an overall antimony removal to sodium addition ratio of 1.6:1. The process was stopped at this stage and the bullion was cleansed of the dissolved sodium by using sulfur and water. A final nitre wash was given to further cleanse the bullion.

During this bullion cleansing process, some of the sulfur reacted with the sodium of the antimony-rich refining dross inherently suspended in the bullion as well as adhering to the kettle walls and some antimony was thereby transferred back into the bullion. The final bullion antimony content, after cleansing, thus was 1.8% by wt. antimony.

From this example, the following observations are made:

(a) It is critically important to maintain the process operating temperature of the bullion at less than 750° F. for maximum efficiency and sodium utilization in antimony removal; however, higher temperatures may be utilized with a sacrifice in process efficiency resulting therefrom; and (b) To overcome the antimony reversal problem during the cleansing operation, the bullion, prior to commencing the cleansing operation, should contain about 0.2% to 0.3% less antimony than the antimony content required in the final bullion.

EXAMPLE VI

An experiment was carried out to refine high antimony-lead bullion using metallic sodium as the refining reagent.

Eighty tons of 4.6% by wt. antimony-lead bullion were refined to make lead—3% by wt. antimony alloy.

Based upon calculations using a ratio of 2 pounds of antimony per pound of sodium, 1200 pounds of metallic sodium were added to the kettle containing the molten bullion at a starting temperature of 700° F. It should be noted that the heat source was shut off once the bullion reached the starting temperature. Along with the sodium, 118 pounds of caustic soda were added, as described in the preferred embodiment. The temperature of the bullion increased from 700° F. (starting temperature) to 800° F. (427° C.) due to the first 900lbs. of sodium addition. The bullion was allowed to settle and cool to 750° F. prior to resuming the agitation and adding the remaining 300 pounds of sodium, which when added, increased the bullion temperature to 790° F. Due to this high temperature, the antimony-rich refining dross was not as sticky and chunky as expected. The bullion was allowed to cool in an attempt to form a chunky, skimmable dross. Instead the dross solidified and formed a hard crust in excess of 6 in. thick. The dross crust had to be broken from the kettle rim and into smaller pieces to facilitate skimming. The complete operation of caustic and sodium addition, antimony removal and antimony-rich dross skimming took 6 hours and 15 minutes. The refined bullion analyzed 2.65% by wt. antimony. The overall antimony removal efficiency was 2.6 pounds of antimony removal per pound of sodium added, as compared to the calculated amount of 2 pounds of antimony removed per pound of sodium added which accounts for the antimony content of 2.65% by wt. in the refined bullion as compared to the specified antimony content of 3% by wt.

The residual sodium present in solution in the refined bullion was removed as a skimmable cleansing dross in a cleansing operation using sulfur and water. With the temperature of the bullion at 700° F., 150 pounds of sulfur were added to the vigorously stirred bullion, accompanied by a continuous spray of water on the surface of the bullion. In about 1 hour and 30 minutes, substantially all of the sodium present in solution was removed. A final cleanse was given using about 50 pounds of nitre.

The detailed analysis of the bullion, including the impurity elements is given in the table below.

TABLE

Bullion Analysis
(All elements except Sb in ppm; Sb shown as % by wt.)

| | Ag | As | Cd | Cu | Hg* | Na** | Ni | S | Sb | Se | Sn | Te |
|---|---|---|---|---|---|---|---|---|---|---|---|---|
| Starting blast bullion | 61 | 1477 | 12 | 1829 | 10 | 0 | 18 | 40 | 4.59 | 5 | 3435 | 55 |
| After 1200 lbs | 53 | 41 | 0 | 377 | 0 | >2500 | 4 | 11 | 2.65 | <1 | 2517 | <1 |

TABLE-continued

| | Bullion Analysis (All elements except Sb in ppm; Sb shown as % by wt.) | | | | | | | | | | |
|---|---|---|---|---|---|---|---|---|---|---|---|
| | Ag | As | Cd | Cu | Hg* | Na** | Ni | S | Sb | Se | Sn | Te |
| of Na | | | | | | | | | | | |

*An emission spectrometer instrument was used in analyzing for the various elements shown; however, with respect to Hg, the instrument was not calibrated, thus the level of Hg is considered to be unreliable.
**The sodium concentration, after the sulfur cleansing step, was 88 ppm and, after the nitre cleansing step, was 4 ppm.

The entire operation of refining a 4.6% by wt. antimony-lead bullion to obtain a final bullion containing 2.65% by wt. antimony using metallic sodium, as above described, took a total of only 9 hours as compared to 20 hours normally required using conventional refining processes.

From this example, the following observations are made:

(a) In order to obtain a skimmable refining dross, it is essential that the bullion temperature not exceed about 750° F; otherwise, the bullion must be cooled to less than 750° F. prior to skimming;

(b) The dross should not be permitted to accumulate in a substantial amount, whereby it may solidify and form a very hard crust which is difficult and time-consuming to remove; and (c) Substantial amounts of arsenic, cadmium, copper, nickel, silver, sulfur, selenium and tellurium were removed. Small amounts of and tin were also removed.

In order to show the economic advantages of using the present process over conventional lead refining processes, tests were carried out at each of two different smelters using metallic sodium to make a 1.4% antimony bullion as shown in EXAMPLE VII as follows:

EXAMPLE VII

Two lead bullion refining experiments (tests) were carried out at each of two different smelters using metallic sodium to make a 1.4% antimony bullion. About 75 tons of bullion were treated in each of the experiments. The cost analysis for the smelting process using sodium for refining is compared with the costs for conventional refining.

Experiment Results:

The chemical analysis of the bullion before and after the experiments is as given in Table 1 below. Tests A and B were carried out at smelter #1, and Tests C and D at smelter #2.

TABLE 1

| | | Bullion Analysis in % by Wt. | | | | | | | |
|---|---|---|---|---|---|---|---|---|---|
| Test | Sample | As | Cu | Na | Ni | S | Sb | Sn | Te |
| A | Starting | .0559 | .049 | 0 | .0004 | .0013 | 2.51 | .57 | .0024 |
| | After Na | .0008 | .023 | .2291 | .0002 | .0011 | 1.35 | .35 | .0002 |
| | After S Cleansing | .0008 | .023 | .0020 | .0002 | .0011 | 1.44 | .34 | .0001 |
| B | Starting | .0972 | .057 | 0 | .0006 | .0007 | 3.53 | .64 | .0002 |
| | After Na | .0008 | .026 | .1361 | .0001 | .0007 | 1.32 | .31 | <.0001 |
| | After S Cleansing | .0011 | .026 | .0199 | .0001 | .0007 | 1.48 | .31 | <.0001 |
| C | Starting | .1728 | .089 | — | .0011 | .0026 | 3.75 | .33 | .0019 |
| | After Na | .0052 | .026 | — | .0001 | .0007 | 1.30 | .11 | 0 |
| | After S Cleansing | .0052 | .018 | — | .0001 | .0013 | 1.35 | .08 | 0 |
| D | Starting | .1442 | .040 | — | .0007 | .0009 | 3.40 | .28 | .0011 |
| | After Na | .0053 | .018 | — | .0001 | .0006 | 1.27 | .09 | 0 |
| | After S Cleansing | .0052 | .02 | — | .0001 | .0007 | 1.49 | .05 | 0 |

The material and time data collected from the four experiments are given below in Table 2.

TABLE 2

| | Material and Time Data | | | | | | |
|---|---|---|---|---|---|---|---|
| | Sb Removed | | Na Used | Sb:Na | Caustic Used | Sulfur Used | Man | Cumulative Process |
| Test | % | lbs. | lbs. | lb:lb | lbs. | lbs. | Hours | Hours** |
| A | 1.1 | 1650 | 1500 | 1.10:1 | 100 | 400 | 12 | 16 |
| B | 2.1 | 3276 | 2175 | 1.50:1 | 200 | 350 | 11:30 | 18:15 |
| C | 2.35 | 3525 | 2250 | 1.60:1 | 200 | 200 | 16 | N.A.* |
| D | 2.0 | 3000 | 1950 | 1.54:1 | 200 | 200 | 12 | N.A.* |

*Not applicable because the tests were only done during the day shift. Work was discontinued at the end of the day shift.
**Includes unattended cooling period.

From this example, it was observed that substantial amounts of arsenic, copper, nickel and tellurium were removed along with the antimony in the refining dross. A limited amount of tin was also removed.

Analysis shown in all of the above examples were made using an emission spectrometer and all elements analyzed to be in impurity level concentrations, and not relevant to the specific example under discussion, were omitted.

Cost Analysis:

For cost analysis purposes, a typical lead bullion was selected to be refined to make a lead-1.5% antimony, 0.42% tin alloy. The lead bullion selected was 4% antimony, 0.7 to 0.8% tin, with varying amounts of arsenic, copper, nickel, tellurium and zinc. The cost analysis for two different methods, namely, Process I—Conventional Refining and Process II—Sodium Refining of the present invention, of processing this lead—4% antimony and 0.7 to 0.8% tin bullion to produce 75 tons of 1.5% Sb and 0.42% Sn alloy is included below.

Process I:
Conventional Refining.

Typical conventional refining process using high temperatures (1150° F. [621° C.]), nitre and caustic as refining agents.

| EXPENSES | |
|---|---|
| Item | Cost |
| Labor | |
| 25 hrs. at $12/hr. (wages + benefits) | $300.00 |
| Refining Materials | |
| Decopperizing: 50 lbs. of sulfur | $8.00 |
| Sn and As removal: 100 lbs. of nitre | $16.00 |
| Sb removal: 1000 lbs. of nitre | $160.00 |
| Cd, Ni, Se & Te removal: | |
| 100 lbs. of caustic | $26.50 |
| Tin Costs | |
| Added to make desired alloy | $3780.00 |
| (630 lbs. at $6/lb.) | |
| Fuel Costs | |
| (Starting at bullion temp. of 600° F.) | $125.00 |
| Total out-of-pocket costs for refining and alloying the 75 tons | $4415.50 |

Process II:
Sodium Refining.

Lead bullion refining using metallic sodium and caustic at low temperatures (600° to 750° F.) in accordance with the present invention.

| EXPENSES | |
|---|---|
| Item | Cost |
| Labor | |
| 18 hrs. at $12/hr. (wages + benefits) | $216.00 |
| Refining Materials | |
| Sodium - 2400 lbs | $2400.00 |
| Caustic - 300 lbs | $79.50 |
| Sulfur - 400 lbs | $66.00 |
| Tin Costs | |
| None | $0 |
| Fuel Costs | |
| (Starting at bullion temp. of 600° F.) | $0 |
| Total out-of-pocket costs for refining the 75 tons | $2761.50 |

The difference in costs between the two processes is seen as $1654.00, a realized saving of approximately 37% by using the process of the present invention (Process II) over the use of the conventional process (Process I). Thus, as is apparent, Process II (sodium refining) is more economical as compared to Process I (conventional softening). But also of great significance here is the fact that the tin is not lost in refining. In Process II, no primary tin is added because the tin existing in the 0.7 to 0.8% tin starting lead bullion is sufficient to meet the specification of the preferred 0.42% tin in the final refined alloy, but would be lost in conventional refining processes.

From the above discussion and examples, it may readily be seen that the present invention offers a novel and economical lead refining process for controlling the antimony content of the final refined alloy and the removal of undesirable alloying elements, to the extent such removal is desired. The process has the further advantage of being sufficiently flexible that with proper agitation control, the tin content of the alloy can be controlled thereby greatly reducing tin loss. The economics of the process resulting from the exothermic reactions and savings on fuel, while maintaining the bullion in a molten state throughout the process, also offers significant advantages in reducing the overall fuel costs. In addition, significant savings are realized in labor costs as the result of using the process of the present invention instead of conventional refining processes.

We claim:

1. An improved process for refining lead bullion containing antimony in an amount in excess of about 0.5% by weight, comprising the following steps:
   (a) heating said lead bullion to a temperature of approximately 25° F. (14° C.) above its melting temperature to form a molten bullion and discontinuing said heat source;
   (b) agitating said molten bullion;
   (c) adding caustic soda to said molten bullion;
   (d) adding metallic sodium to said molten bullion;
   (e) mixing said caustic soda and said metallic sodium into said molten bullion;
   (f) forming a skimmable refining dross comprising sodium-antimony intermetallic;
   (g) separating said dross from said refined molten bullion;
   (h) cleansing said refined bullion to remove substantially all sodium in solution in said bullion as a skimmable cleansing dross; and
   (i) controlling throughout the steps (b) through (h) of said process an operating temperature of said molten bullion within the temperature range of 600° F. (316° C.) to 800° F. (427° C.) utilizing the heat from the exothermic reactions of said process, and cooling as necessary, to maintain said bullion temperature within said range.

2. The process set forth in claim 1, wherein upon the completion of the addition of all of the required sodium, agitation is stopped to prevent excessive loss of any tin present in the bullion and the inadvertent reversal of antimony back into the bullion from said refining dross.

3. The process set forth in claim 1, wherein said refining process removes antimony from said lead bullion to the extent that a predetermined amount of amintomy remains in said bullion to form a lead-antimony alloy containing less antimony than the initial bullion charge.

4. The process set forth in claim 1, wherein said molten bullion is maintained in the molten state by the exothermic reactions between sodium and antimony, heat of solution and sodium burning resulting from the addition to said bullion of metallic sodium.

5. The process set forth in claim 1, wherein the ratio of the quantity of antimony removed as sodium-antimony intermetallic to the quantity of metallic sodium added is within the ratio range of 5 units of antimony:1 unit of sodium to 0.5 units of antimony:1 unit of sodium.

6. The process set forth in claim 1, wherein the quantity of caustic soda added to the quantity of sodium added is within the ratio range of 1:15 to 1:4.

7. The process set forth in claim 1, wherein said cleansing step includes the addition of a cleansing reagent which reacts with the sodium to form sodium compounds which are insoluble in said bullion and form a skimmable cleansing dross.

8. The process set forth in claim 7, wherein said cleansing reagent includes a reagent selected from the group comprising the elements of selenium, tellurium, phosphorus and chlorine and mixtures thereof and mixing said reagent into the bullion to thereby form a skimmable cleansing dross comprising sodium compounds of said reagent, and separating said dross from said bullion.

9. The process set forth in claim 7, wherein said cleansing reagent is sulfur and is mixed into the bullion to thereby form a skimmable cleansing dross comprising sulfur-sodium compounds, and separating said dross from said bullion.

10. The process set forth in claim 1, wherein said caustic soda and said metallic sodium are added in increments.

11. The process set forth in claim 10, wherein said incremental addition of metallic sodium is regulated to control the temperature of the molten bullion below about 750° F. (399° C.).

12. The process set forth in claim 1, wherein the ratio of the quantity of caustic soda added to the quantity of antimony removed is within the range of 1:75 to 1:2.

13. The process set forth in claim 1, wherein the operating temperture of said process is not in excess of about 750° F. (399° C.) during the sodium adding step.

14. The process set forth in claim 1, wherein the quantity and frequency of sodium addition in the step of adding metallic sodium are regulated to prevent the temperature of the molten bullion exceeeding about 800° F. (427° C.) as the result of such sodium addition.

15. The process set forth in claim 13, including the step of cooling the molten bullion to a temperature below about 700° F. (371° C.) when the bullion temperature exceeds about 750° F. (399° C.).

16. The process set forth in claim 1, wherein any bullion elements of arsenic, cadmium, copper, nickel, silver and zinc present in the bullion react with sodium to form intermetallics and any sulfur, selenium and tellurium present in the bullion react with sodium to form compounds and said intermetallics and said compounds are separated, along with the sodium-antimony intermetallic, as skimmable refining dross from said refined bullion.

17. The process set forth in claim 1, wherein any tin present in the lead bullion to be refined is substantially retained in the refined bullion by regulating the amount of caustic added and the amount and degree of bullion agitation.

18. The process set forth in claim 1, wherein said skimmable refining dross is characterized as black, soft, sticky and chunky and easily skimmable.

19. A process for refining lead bullion containing antimony comprising the steps of:
(a) adding a lead-antimony bullion to a container in which said bullion is to be refined;
(b) heating said bullion to a temperature of 25° F. above its melting point to form a molten lead bullion;
(c) discontinuing said heat source;
(d) agitating said molten bullion;
(e) adding caustic soda to said molten bullion;
(f) adding metallic sodium to said molten bullion;
(g) mixing said caustic and said sodium into said molten bullion;
(h) forming a skimmable refining dross comprising a sodium-antimony intermetallic;
(i) separating said dross from said molten bullion;
(j) cleansing said molten bullion of substantially all sodium remaining in solution by adding a cleansing reagent which reacts with the sodium in the bullion to form a skimmable cleansing dross;
(k) separating said cleansing dross from said bullion; and
(l) maintaining throughout the steps (d) through (h) of said process an operating temperature of said molten bullion within the temperature range of 600° F. (316° C.) to 800° F. (427° C.) utilizing the heat from the exothermic reactions of said process, and cooling as necessary, to maintain said bullion temperature within said range.

20. The process set forth in claim 19, wherein said bullion is maintained in the molten state throughout the refining operations primarily as the result of exothermic chemical reactions between said sodium additive and antimony contained in solution in said bullion.

21. The process set forth in claim 19, wherein said bullion is maintained in the molten state throughout the refining operations as the result of exothermic chemical reactions between said sodium additive and at least one element contained in solution in said bullion and as the result of heat of solution liberated by sodium going into solution in said bullion.

22. The process set forth in claim 19, wherein said cleansing reagent is sulfur.

23. The process set forth in claim 19, wherein said refining process removes antimony from said lead bullion to the extent that a predetermined amount of amintomy remains in said bullion to form a lead-antimony alloy containing less antimony than the initial bullion charge.

* * * * *